3,437,589
PROCESS FOR PRETREATING HYDROCRACKING STOCK TO REMOVE NITROGEN THEREFROM

Richard G. Goldthwait, Penn Hills Township, Allegheny County, and Stanley J. Kwolek, New Kensington, Pa., assignors to Gulf Research & Development Company, Pittsburgh, Pa., a corporation of Delaware
No Drawing. Continuation-in-part of application Ser. No. 435,044, Feb. 24, 1965. This application June 30, 1967, Ser. No. 650,188
Int. Cl. C10g 23/02
U.S. Cl. 208—254                                    16 Claims

ABSTRACT OF THE DISCLOSURE

Nitrogen is removed from a hydrocarbon feed stock by employing a hydrocracking catalyst of nickel-tungsten-halogen on a siliceous cracking carrier having an index greater than 40. The process is carried out by flowing the feed stock and hydrogen cocurrently through the reaction zone at a temperature of 500–850° F. at a hydrogen partial pressure above 700 p.s.i. and hydrogen feed rate of more than 1000 standard cubic feet per barrel of feed stock. Operating conditions limit conversion to lower boiling materials to an amount less than 10% by volume.

---

This application is a continuation-in-part of application Ser. No. 435,044 of Goldthwait and Kwolek, filed Feb. 24, 1965, and now abandoned.

Our invention relates to an improved procedure for the pretreatment of hydrocracking feed stocks. More particularly our invention relates to a process for removing nitrogen and nitrogen compounds from hydrocracking feed stocks containing such constituents.

The desirability of charging a low nitrogen content feed stock to a hydrocracking process employing the usual hydrocracking catalysts in order to prevent nitrogen poisoning of such catalysts has been recognized in the art. Various different methods have been previously suggested in the art for the removal of nitrogen contaminants from a feed stock prior to hydrocracking such stock. Thus, for example, it has been suggested that hydrogenation would be a desirable means of accomplishing such purpose. The hydrogenation processes suggested by the art have required the employment of hydrogenating catalysts and operating conditions selected so as to effect the removal of nitrogen compounds and other undesirable constituents, such as sulfur and oxygen, without any substantial cleavage of carbon-to-carbon bonds. While such previously suggested treatments may at times result in an over-all decrease in the boiling range of the feed stock or at least a reduction in boiling range of certain fractions of the feed stocks and a slight increase in API gravity, such changes in physical characteristics were caused by the removal of contaminant components from large hydrocarbon molecules thereby effecting separation into smaller molecules of lower boiling point and higher API gravity, but this was desirably accomplished almost in the entire absence of any severance of carbon-to-carbon bonds.

When a supported catalyst was employed in such previously suggested techniques, the art has always taught that it is essential to employ a support or carrier having no cracking activity or at least only an extremely low cracking activity such as, for example, an alumina support, and in some instances a silica stabilized alumina support containing less than about 5 percent silica.

We have discovered that certain hydrocracking catalysts, which are normally considered to be poisoned by nitrogen, can advantageously be employed under certain operating conditions to provide means for removing nitrogen contaminants from hydrocracking feed stocks. We have further found that these hydrocracking catalysts are far more active than standard denitrogenation catalysts when employed in accordance with our invention, thus permitting reduced reactor volumes in commercial operations which substantially reduces costs and enhances the operation.

Our invention comprises contacting a nitrogen containing hydrocracking feed stock with hydrogen in the presence of a halogen-containing dual component hydrocracking catalyst. The hydrogenating component of this catalyst comprises nickel and tungsten, which component is supported on a siliceous cracking carrier having a high cracking activity index. The operating conditions employed in our process include a temperature in the range from about 500° to about 850° F. and preferably from about 615° to about 800° F., a hydrogen partial pressure of at least about 700 p.s.i. and a liquid hourly space velocity from about 0.5 to about 5.0 and preferably from about 1.0 to 3.5 volumes of feed stock per volume of catalyst per hour. When practicing the process of our invention and employing the operating conditions mentioned above, we have found that a hydrogen feed rate above about 1000 standard cubic feet of hydrogen per barrel of feed stock is to be employed. While there is not necessarily any upper limit, from the standpoint of operability, to the hydrogen feed rate which can be employed in the process of our invention, we have found that there would not appear to be any economic advantage to be gained by employing a hydrogen feed rate in excess of about 20,000 standard cubic feet per barrel of feed stock. Also in accordance with our invention we effect the contacting of the feed stock with the hydrogen by flowing such reactants cocurrently through a reaction zone containing the catalyst.

The catalyst utilized in our process can contain between about 5 and 40 percent and preferably 10 to 25 percent of nickel plus tungsten (determined as metals). The atomic ratio can be between 1 atom of tungsten to 0.1 atom of nickel to 1 atom of tungsten to 5 atoms of nickel. A range of between 1 atom of tungsten to 0.3 atom to 4 atoms of nickel is preferred. A particularly preferred atomic ratio is about 1:1 nickel to tungsten. The catalyst can also contain from about 0.5 to about 4 percent by weight of combined halogen. Any siliceous carrier can be employed which has a cracking activity index of at least 40. (See J. Alexander et al., "Laboratory Method for Determining the Activity of Cracking Catalysts," National Petroleum News, volume 36, 1944, p. R–537.) A siliceous carrier which has an activity index above 45 is preferably employed. Such siliceous carriers are known in the catalytic cracking art, a typical example being silica-alumina cracking catalysts. These carriers may contain varying amounts of alumina and silica, from about 10 to about 90 percent by weight silica and from about 90 to 10 percent alumina, preferably, however, the carriers contain at least about 25 percent silica and more preferably contain at least about 50 percent silica. These catalysts may also contain other metal oxide components such as zirconia, thoria, magnesia, etc. Any of such mixtures may be employed as long as the carrier displays the characteristics of an active silica-alumina cracking catalyst. Especially useful materials are the so-called high alumina synthetic silica-alumina cracking catalysts containing about 25 percent alumina such as "Triple A" silica-alumina or the equivalent catalyst in other forms such as, for example, crushed, spherical, extruded, pelleted, etc. These carriers are most advantageous when they are characterized by a surface area of 450 square meters per gram or greater and preferably 500 square meters per gram or greater.

The catalyst employed in this invention can be prepared using any known procedure for manufacture of such multi-component catalysts. Thus, for example, the nickel and tungsten components can be deposited upon the cracking carrier by co-precipitation. Alternatively, they can be deposited in sequence with or without intervening calcination. Simultaneous impregnation from a two-component solution containing the two materials can also be employed. Thus, the procedure described in McKinley et al., U.S. Patent 2,703,789, would be entirely satisfactory.

The stocks which can be treated in accordance with our invention include all petroleum stocks which, except for their high nitrogen concentration, are suitable for hydrocracking, including most non-residual stocks. Although stocks such as naphthas are suitable, we prefer to employ stocks falling within or above the furnace oil range. Thus, for example, preferred feed stocks to the process of our invention include, for example, furnace oils boiling generally from about 350° to about 650° F. and having a nitrogen content which can be as high as about 2000 p.p.m. and gas oils boiling generally in the range from about 650° up to about 1100° F. and which can have a nitrogen content as high as about 6000 p.p.m. It will be understood, of course, that although gas oils generally tend to have a higher nitrogen content than do furnace oils, it is not at all unusual to find that some furnace oils have a higher, in many instances substantially higher, nitrogen content than do some gas oils. Generally furnace oils can be described as boiling in the range from about 350° to about 650° F. and having a nitrogen content which can range up to as high as about 2000 p.p.m. On the other hand, gas oils can generally be described as boiling in the range from about 650° to about 1100° F. and having a nitrogen content up to as high as 6000 p.p.m. Generally stocks such as these can advantageously be treated in accordance with the process of our invention. Illustrative of a particularly suitable feed stock for our invention is a fluid catalytically cracked furnace oil having a nitrogen content above about 200–250 p.p.m. nitrogen. This is not to say, however, that the process of our invention is not operable in treating stocks with a lower nitrogen content. Thus when employing our process to treat stocks having a nitrogen content somewhat lower than 200 p.p.m., e.g., about 150 p.p.m., although the problem of nitrogen removal may be lessened slightly, our process can be conducted utilizing a space velocity much higher than might otherwise be employed. We have found, however, that when treating stocks with an extremely low nitrogen content, e.g., 25 p.p.m. and less, the significant advantages to be gained from our process are not exploited to their fullest. We have also found that stocks of the type described above which also contain contaminants other than nitrogen, such as, for example, sulfur in quantities of about 3 or 4 percent, can also be treated advantageously in accordance with our invention.

When employing the process of our invention the particular combination of operating conditions selected for the treatment of any particular stock is determined primarily by the nitrogen content of the stock to be treated and secondarily by the boiling range of such stock. Generally it is advantageous to employ a more severe set of operating conditions for treatment of a higher nitrogen contact feed stock and less severe conditions with a low nitrogen content feed. It should also be pointed out that as between two stocks having different boiling ranges but having substantially the same nitrogen content we have generally found it to be advantageous to employ somewhat more severe operating conditions when treating the higher boiling of the two stocks.

When it is desired to treat in accordance with our invention a furnace oil boiling in the range from about 350° to about 650° F., which stock can contain up to about 2000 p.p.m. of nitrogen, it will generally be satisfactory to employ a temperature in the range from about 500° to about 800° F. and preferably from about 615° to about 700° F. A particularly advantageous temperature range for the treatment of such a stock is about 635° F. to about 685° F. The range of hydrogen partial pressures which we have found to be satisfactory for the treatment of furnace oils is in the range from about 750 to about 1500 p.s.i. Within this range of hydrogen partial pressures we have found that it is advantageous to employ a hydrogen partial pressure from about 750 to about 850 p.s.i. for treating a stock containing from about 200 to about 300 p.p.m. nitrogen. When it is desired to treat such a furnace oil stock containing about 350 p.p.m. nitrogen or more a hydrogen partial pressure in the range from about 900 to about 1200 p.s.i. should be employed. We have also found that the employment of a space velocity from about 0.5 to about 5.0 is satisfactory for the treatment of furnace oils. A space velocity from about 1.0 to about 3.5 is preferred for the treatment of such furnace oil stocks containing about 200 p.p.m. of nitrogen or more. While as stated above a hydrogen feed rate greater than 1000 standard cubic feet per barrel of feed stock should be employed, we prefer to employ a hydrogen feed rate in the range from about 3500 to about 7000 standard cubic feet per barrel. When operating our process employing hydrogen partial pressures in the range from 750 to 1500 p.s.i., we have found that it is satisfactory to employ a total pressure in the range from about 750 to about 2500 p.s.i.g., such as when operating with a typical refinery hydrogen stream of 60–85 percent hydrogen purity.

When it is desired to treat in accordance with our invention a gas oil boiling generally in the range from about 650° to 1100° F. and containing up to as much as 6000 p.p.m. of nitrogen, we have found that within the general operating temperature range of 500° to 850° F. it is advantageous to operate within the range from about 650° to about 800° F. and preferably at the higher temperatures within this range. We have also found that in the treatment of such gas oils it is desirable to employ a hydrogen partial pressure in the range from about 1000 to about 3000 p.s.i. Suitable space velocities for the treatment of gas oils in accordance with our invention range from about 0.5 to about 5.0 and preferably from about 1.0 to about 3.5. Furthermore, we have found that a hydrogen feed rate of about 3500 standard cubic feet per barrel of gas oil is satisfactory. Preferably, however, a hydrogen feed rate of 5000 standard cubic feet per barrel or more should be employed. It should also be noted that hydrogen feed rates substantially greater than those indicated above can also be employed satisfactorily; however, there does not appear to be any great advantage to be gained when employing a hydrogen feed rate in excess of 20,000 standard cubic feet per barrel.

Generally we prefer to operate at the lower temperatures within the above ranges during the earlier periods of operation in accordance with our invention, gradually increase the temperature as the operation proceeds and terminate the operation when a higher temperature at the upper end of the above ranges is attained. Accordingly, we prefer to commence operation at a temperature in the range from about 500° to about 700° F., more preferably from about 600° to about 700° F., and terminate operation when a temperature from about 640° to about 850° F., more preferably from about 640° to about 800° F., is attained. When treating a furnace oil in accordance with our invention suitable initial temperatures range from about 500° to about 650° F., preferably from about 615° to about 650° F., and more preferably from about 635° to about 650° F. Suitable terminal temperatures for the treatment of a furnace oil in accordance with our invention range from about 640° to about 800° F., preferably from about 640° to about 700° F., and more preferably from about 640° to about 685° F. In the treatment of a gas oil in accordance with our invention the initial temperature can range from about 500° to about 700° F., preferably from about 650° to about 700° F., while the terminal temperature can range from about 700° to about 850° F., preferably from about 700° to about 800° F.

The advantages to be gained when employing the process of our invention include among others providing a pretreated hydrocarbon feed stock containing a substantially lower amount of nitrogen than is obtained when employing processes of the prior art utilizing standard pretreating catalysts. This advantage is particularly noticeable when pretreating furnace oils, whereby pretreated hydrocracking feed stocks containing less than 1 p.p.m. nitrogen and advantageously less than 0.5 p.p.m. nitrogen can be obtained. The obvious result of this is to reduce to an extremely low level the nitrogen poisoning of the catalyst in the subsequent hydrocracking operation. Another advantage to be obtained by the operation of our invention is the employment of a space velocity substantially greater than that traditionally employed in the pretreating processes of the prior art. Indicative of the value of employing increased space velocity is the fact that reactor volume can be decreased to the extent that it has been estimated that doubling the space velocity in a 15,000 b./d. pretreating unit from 1.0 to 2.0 would effect an annual savings somewhat in excess of $100,000 in addition to reducing initial construction costs. It will be readily understood, therefore, that employment of our inventive process in existing refineries provides a greater degree of nitrogen removal while increasing the throughput capacity of the pretreating reactor by using a higher space velocity. In the design of new facilities the process of our invention permits the employment of a substantially smaller pretreating reactor with reduced costs of construction and catalyst inventory and still provides a pretreated stock of extremely low nitrogen content.

As will be understood, some small quantity of lower boiling material may be produced or a small over-all decrease in boiling range may be effected in the process of our invention due to the removal of nitrogen and other undesirable constituents thereby producing smaller, lighter molecules. Hydrocracking, i.e. cleavage of carbon-to-carbon bonds, is not essential to the operation of our process and usually can be avoided. Generally, the process of our invention is conducted so as to effect conversion (100 percent minus percent by volume boiling above IBP of feed stock) to lower boiling materials of less than 10 to 12 percent by volume. Conversions of less than 5 percent by volume and even less than 1 percent by volume are quite common in the practice of our invention.

The presence of a halogen, particularly fluorine, is essential to the catalyst employed in our inventive process since it facilitates the cleavage of carbon-to-nitrogen bonds and enhances the general nitrogen removal capability of the process.

In order to illustrate our invention in greater detail, reference is made to the following examples.

EXAMPLE I

In this example three catalysts were employed in the pretreatment of a high nitrogen content FCC furnace oil having the following inspections.

Table I

| | |
|---|---|
| Gravity: °API | 22.5 |
| Distillation, ASTM D158: | |
| Over point: °F. | 374 |
| End point: °F. | 637 |
| 10% at: °F. | 438 |
| 30% | 474 |
| 50% | 505 |
| 70% | 539 |
| 90% | 587 |
| Hydrocarbon Type: Percent by vol.[1] | |
| Saturates | 25.7 |
| Paraffins | 12.8 |
| Naphthenes | 12.9 |
| Aromatics | 66.2 |
| Olefins | 8.1 |
| Sulfur: p.p.m. by wt. | 6000 |
| Nitrogen: p.p.m. by wt. | 270 |

[1] FIA, ASTM D–1319, and high temperature mass spectrometric analyses.

As indicated in Table I and throughout the specification and claims the nitrogen content of the hydrocarbon materials, both the charge to and the effluent from the process of our invention, is expressed in parts per million by weight (p.p.m.) The determinations of nitrogen content were made by two different methods in order to insure a greater degree of accuracy.

The first method was employed for samples of materials estimated to have a nitrogen content of 25 p.p.m., e.g., stocks treated in accordance with our invention. In accordance with this method a sulfuric acid extract of the sample was digested, neutralized, and distilled according to standard Kjeldahl nitrogen procedure. The liberated ammonia was absorbed in dilute sulfuric acid and determined by automatic potentiometric titration with standard sodium hydroxide solution. The nitrogen values were computed from the difference between this titration and a blank determination.

The second method was employed for samples of materials estimated to have a nitrogen content of more than 25 p.p.m., e.g., all of the raw feeds. In accordance with this method the nitrogen was converted to ammonium sulfate by boiling with concentrated sulfuric acid in the presence of potassium sulfate and a catalyst. The nitrogen was determined by adding an excess of caustic to the solution and distilling off the ammonia into boric acid solution and subsequently titrating with standard sulfuric acid.

One of the catalysts employed in this example was a standard pretreating catalyst comprising 6 percent nickel and 19 percent tungsten supported on Filtrol Grade 86 alumina, another was a 3 percent cobalt and 8 percent molybdenum or silica-alumina catalyst, while the third catalyst was the hydrocracking catalyst required by our invention and comprised 6 percent nickel and 19 percent tungsten supported on "Triple A" silica-alumina, promoted with 2 percent fluorine. Pretreating runs were conducted employing each of these catalysts at two different space velocities but maintaining the other operating conditions at an average temperature of 635° F., 1225 p.s.i.g. total pressure and 6000 standard cubic feet of hydrogen rich (71 percent) gas per barrel of feed. (This is equivalent to about 795 p.s.i. hydrogen partial pressure.) In the first series of pretreating runs employing each of the catalysts, the space velocity was 1.5 while in the second series of runs the space velocity was 2.5 volumes per volume per hour. Each of the six runs in this example was conducted for a period from about 12 to 14 days, but no data was recorded until after two to three days' operation. Thus, the data obtained represent relatively fresh catalyst activity but do not include any unusually high initial activity, if present. In each of the runs there was produced less than about 0.2 percent by volume of material boiling in the gasoline or lighter range.

TABLE II

| Product inspections | Catalyst of this invention | Commercial pretreating catalyst | Co-Mo on $SiO_2$-$Al_2O_3$ |
|---|---|---|---|
| Series 1 (LHSV 1.5): | | | |
| N content p.p.m. | 0.6 | 2.0 | 2.4 |
| IBP, °F | 375 | 379 | 389 |
| 10% | 423 | 425 | 426 |
| 50% | 481 | 482 | 483 |
| 90% | 572 | 572 | 570 |
| Series 2 (LHSV 2.5): | | | |
| N content, p.p.m. | 0.8 | 12.5 | 15.4 |
| IBP, °F | 389 | 387 | 387 |
| 10% | 422 | 427 | 427 |
| 50% | 483 | 489 | 490 |
| 90% | 576 | 577 | 574 |

From the data shown in Table II above for the first series of runs, it will readily be seen that a pretreated hydrocracking feed stock is obtained in accordance with our invention when employing a space velocity of 1.5 which pretreated stock contains less than 1 p.p.m. by weight of nitrogen and contains less than one-third the quantity of nitrogen obtained under identical conditions but employing either a standard pretreating catalyst or another dual component catalyst on a cracking carrier. By comparing the data shown for the second series of runs, it will be noticed that even when employing a space velocity of 2.5 the process of our invention still provides a pretreated hydrocracking feed stock having less than 1 p.p.m. nitrogen, while under identical conditions but employing either the standard pretreating catalyst or the cobalt-molybdenum cracking catalyst, the pretreated hydrocracking feed stock produced contains more than 15 times as much nitrogen. Furthermore, extrapolation of the data of this example indicates that when operating in accordance with our invention to treat a furnace oil stock and employing the temperature and other operating conditions shown above, a space velocity somewhat above 3.0 can be employed and still provide a pretreated stock having less than 1 p.p.m. of nitrogen.

EXAMPLE II

In this example the same feed stock described in Example I was again employed. The catalyst employed was the hydrocracking catalyst employed in accordance with our invention and described in Example I. Again two runs were made at two different space velocities of 1.5 and 2.5 LHSV. The temperature employed in the runs of this example was 665° F., but all other operating conditions were the same as in Example I, i.e., a total pressure of 1225 p.s.i.g. and a gas rate of 6000 standard cubic feet of hydrogen rich (71 percent) gas per barrel of feed to provide a hydrogen partial pressure of 795 p.s.i.a. In the runs of this example the employment of 1.5 LHSV yielded a pretreated product having a nitrogen content of 0.3 p.p.m. with the production of about 0.6 percent by volume of lower boiling materials, while the employment of a 2.5 LHSV provided a pretreated product having a nitrogen content of 0.4 p.p.m. with the production of about 0.5 percent by volume of lower boiling materials. From this example it can be seen that the process of our invention can be operated so as to provide a pretreated furnace oil having consistently less than 0.5 p.p.m. nitrogen even while operating at a liquid hourly space velocity as high as 2.5. Extrapolation of the data of this example indicates that when operating under the conditions employed in this example a space velocity of somewhat greater than 3.0 can be employed and still provide a pretreated product stream containing less than 1.0 p.p.m. nitrogen.

EXAMPLE III

In this example an aging run was conducted to demonstrate the catalyst life provided with the process of our invention. This run was conducted initially employing a LHSV of 1.0, a total pressure of 1225 p.s.i.g., 6000 s.c.f. of hydrogen rich (71 percent) gas per barrel of oil feed and no scrubbing of recycled gas. The temperature selected was such as to maintain a nitrogen content of 0.2 to 1.0 p.p.m. in the pretreated product. The initial charge stock was the same 270 p.p.m. nitrogen content stock of Examples I and II and the catalyst employed was the same nickel-tungsten fluorine on silica-alumina of our invention also described in Examples I and II.

The initial operating temperature selected was 630° F., and this temperature was sufficient to provide a pretreated product containing 0.3 p.p.m. or less nitrogen during the initial 20 days. The production of lower boiling materials during this period of operation was indicated to be less than about 0.2 percent by volume. During the period from the 20th to the 25th day, the operating temperature was lowered to 610° F. for a short period of time. While operating at this temperature the nitrogen content of the pretreated product increased to about 1.0 p.p.m. On the 25th day the reactor temperature was increased to 615° F. and the product nitrogen content decreased to 0.5 p.p.m. The aging run was continued for a period of 30 additional days during which time the temperature was held constant at 615° F. and nitrogen content in the product increased to only 0.5 p.p.m. The run was then continued for a total age of 115 days, during the last 60 days of which a space velocity of 2.0 or higher was employed. On the 58th day the temperature was increased to 635° F. while maintaining the space velocity at 2.0, on the 60th day the conversion to lower boiling materials was less than about 0.2 percent by volume, and on the 70th day the temperature was increased to 650° F. to produce a product containing less than 0.5 p.p.m. nitrogen. The production of lower boiling materials on the 74th day was still less than about 0.2 percent by volume. On the 75th day the charge stock was changed to a 100 p.p.m. nitrogen content FCC furnace oil while maintaining a temperature of 650° F. and a space velocity of 2.0, which provided a product containing about 0.2 p.p.m. nitrogen with the production of less than about 0.2 percent by volume of material boiling below the furnace oil range. On the 85th day the space velocity was increased to 3.0 while employing the same charge stock and temperature to produce a pretreated product having substantially less than 0.5 p.p.m. nitrogen. On the 88th day the conversion to lower boiling materials was about 0.5 percent by volume. At about the 96th day the space velocity was increased to 3.25 and the product obtained had a nitrogen content of only about 0.6 p.p.m. The conversion to gasoline and lighter materials was less than about 0.2 percent by volume on the 100th day. This treatment was continued until the 110th day, at which time a 220 p.p.m. nitrogen content FCC furnace oil was charged and a temperature of 650° F. and a space velocity of 2.0 were employed to provide a pretreated product having about 0.1 p.p.m. nitrogen content. On the 111th day the conversion to lower boiling materials was about 0.2 percent by volume. The temperature was then reduced to 640° F. with the same charge stock and space velocity and a termination on the 115th day the pretreated product nitrogen content was about 1.0 p.p.m., thereby indicating that the catalyst still possessed considerable activity.

After 115 days of operation the pretreating process was stopped and the catalyst was regenerated by removal of carbonaceous materials using standard commercial regeneration procedures. Subsequent to regeneration the catalyst was again placed on stream and a second cycle aging run was commenced employing a space velocity of 1.0 and a temperature of 615° F. while charging the same 270 p.p.m. nitrogen content FCC furnace oil employed initially to provide a pretreated product containing less than 1.0 p.p.m. of nitrogen. During the period from the 18th to the 40th day of this second cycle a temperature of 625° F. was employed to provide a satisfactory product containing less than 1.0 p.p.m. nitrogen. On the 27th day the conversion to lower boiling materials was about 0.6 percent by volume. For the period from the 41st to the 62nd day 10 p.p.m. of fluorine were added to the process. On the 59th day of this second cycle the temperature was increased to 640° F. which appeared to enhance substantially the nitrogen removal capabilities of our process while maintaining conversion to gasoline and lighter fractions at about 0.5 percent by volume. On the 62nd day of this second cycle the quantity of fluorine addition was reduced to 4 p.p.m. and continued to the 69th day. During this period the nitrogen content of the pretreated product was substantially below 1.0 p.p.m. On the 69th day the charge stock was changed to a 220 p.p.m. nitrogen content FCC furnace oil and a space velocity of 2.0 and a temperature of 640° F. were employed until termination on the 85th day of the second cycle. A satisfactorily low nitrogen content pretreated product was obtained until termination on the 85th day.

EXAMPLE IV

In this example an FCC furnace oil having a nitrogen content of about 150 p.p.m. is contacted with a nickel-tungsten fluorine on silica-alumina catalyst under conditions of temperature and partial pressure in accordance with our invention. The particular hourly space velocity selected for this example is 5.0. These conditions provide a satisfactory pretreated product having less than 1.0 p.p.m. nitrogen together with a satisfactory long catalyst life.

EXAMPLE V

In this example the charge stock employed was a virgin gas oil having the following inspections:

Gravity, °API _____ 22.9.
Sulfur, percent by wt. _____ 0.68.
Nitrogen, p.p.m. by wt. _____ 660.
ASTM dist. vac. °F. at 760 mm., percent:
  5 _____ At 611° F.
  10 _____ At 652° F.
  30 _____ At 756° F.
  50 _____ At 824° F.
  70 _____ At 892° F.
  90 _____ At 977° F.

This charge stock was treated in two separate runs in the presence of two different catalysts. One catalyst was the standard pretreating catalyst composed of 6 percent nickel, 19 percent tungsten on Filtrol Grade 86 alumina described and employed in Example I. The other catalyst was the hydrocracking catalyst required by our invention which was described and employed in Examples I to IV. The operating conditions employed in both runs were substantially the same and included a temperature of 760° F., a liquid hourly space velocity of 1.5, a hydrogen partial pressure of about 2185 p.s.i. and a hydrogen feed rate of about 8900 standard cubic feet per barrel. The run employing the standard pretreating catalyst provided a product containing 150 p.p.m. of nitrogen, while the nitrogen content of the product obtained from the run operated in accordance with our invention and employing the hydrocracking catalyst was only 40 p.p.m. The conversion (100 percent minus percent by volume unconverted gas oil) obtained in the run in accordance with our invention was only 9 percent by volume.

EXAMPLE VI

In this example the charge stock employed was a high nitrogen content coker gas oil having the following inspections:

Gravity, °API _____ 18.9.
Sulfur, percent by wt. _____ 0.65.
Nitrogen, p.p.m. by wt. _____ 2900.
ASTM dist., vac. °F. at 760 mm., percent:
  5 _____ At 772° F.
  10 _____ At 774° F.
  30 _____ At 785° F.
  50 _____ At 792° F.
  70 _____ At 825° F.
  90 _____ At 876° F.

This gas oil was treated in accordance with our invention at a temperature of 775° F., a liquid hourly space velocity of 1.01, a hydrogen partial pressure of 2355 p.s.i., a total pressure of 2500 p.s.i.g. and a hydrogen feed rate of 9325 standard cubic feet per barrel in the presence of the fluorine containing nickel-tungsten on silica-alumina hydrocracking catalyst required by our invention and employed in the previous examples. The pretreated product stream recovered in this example had a nitrogen content of 36 p.p.m. Furthermore, the sulfur content had been reduced from 0.65 percent to less than 0.05 percent by weight. The conversion to lower boiling materials in this example was about 2.1 percent by volume.

Certain of the economic advantages obtained in accordance with our invention are illustrated in Table III below wherein the cost of catalyst is shown for operation of our invention as opposed to operation of a prior art pretreating process. The data of Table III are based upon a 10,000 b./d. pretreating unit operated at a temperature of 635° F. in order to reduce the nitrogen content of a 270 p.p.m. nitrogen content FCC hydrocracking stock similar to that employed in Examples I to III to a nitrogen content of 1 p.p.m. or less. The comparison is made between the employment of the nickel-tungsten on Grade 86 alumina of Example I and the halogenated nickel-tungsten on "Triple A" silica-alumina of Examples I through III.

TABLE III

| LHSV | Ni-W on Al$_2$O$_3$, Cost: $ | F-Ni-W on SiO$_2$-Al$_2$O$_3$, Cost: $ |
| --- | --- | --- |
| 1.0 | 286,000 | 230,000 |
| 1.5 | Inoperable | 153,333 |
| 2.5 | Inoperable | 92,000 |
| 3.0 | Inoperable | 76,666 |

From the data shown in Table III it can be seen that the cost of the catalyst inventory required when operating in accordance with our invention at a space velocity of 1.0 is some $50,000 less than that required for the catalyst inventory of a standard nickel-tungsten on alumina pretreating catalyst. It will be noticed also that the use of a standard pretreating catalyst at a space velocity of only 1.5 is not capable of producing a pretreated feed stock having less than 1 p.p.m. under these conditions as was demonstrated in Example I. As opposed to this, the process of our invention can be satisfactorily operated to provide a pretreated stock containing less than 1 p.p.m. under the same operating conditions but employing space velocities of 1.5, 2.5 and 3.0. The savings effected in catalyst inventory alone are dramatically illustrated by the substantially reduced costs shown when operating at the higher space velocities of our invention, which savings amount to from over $100,000 at a space velocity of 1.5 to over $200,000 at a space velocity of 3.0. To these savings in catalyst inventory must also be added the savings in construction costs effected in new installations resulting from the requirement for a substantially smaller reactor than presently required with standard pretreating techniques.

We claim:

1. The process for removing nitrogen from a nitrogen containing hydrocarbon feed stock which comprises contacting the feed stock with hydrogen by flowing the feed stock and hydrogen cocurrently through a reaction zone while in the presence of a halogen containing dual component hydrocracking catalyst comprising nickel and tungsten as the hydrogenating components supported on a siliceous cracking carrier having an activity index greater than 40, at a temperature from about 500° F. to about 850° F., a hydrogen partial pressure above about 700 p.s.i., a liquid hourly space velocity from about 0.5 to about 5.0 volumes of hydrocarbon feed stock per volume of catalyst per hour and a hydrogen feed rate of more than about 1000 standard cubic feet per barrel of feed stock, the hydrogenating components comprising from about 5 to about 40 percent by weight based upon total catalyst of nickel plus tungsten and from about 0.5 to about 4 percent by weight based upon total catalyst of combined halogen and the cracking carrier comprising from about 10 to about 90 percent by weight based upon the carrier of silica, the conditions being selected so as to provide a conversion of less than about 10 percent by volume.

2. The process of claim 1 wherein the temperature is from about 615° F. to about 800° F., the hydrogen partial pressure is from about 750 to about 3000 p.s.i., the liquid hourly space velocity is greater than 1.0, the hydrogen feed rate is greater than 3500 standard cubic feet per barrel, the atomic ratio of the hydrogenating components is from about one atom of tungsten to 0.1 to 5.0 atoms of nickel and the cracking carrier has an activity index greater than 45 and contains from about 25 to about 90 percent by weight silica.

3. The process of claim 1 wherein the cracking carrier is silica-alumina.

4. The process of claim 1 wherein the feed stock boils in the range from about 350° F. to about 1100° F.

5. The process of claim 1 wherein the catalyst comprises about 6 percent by weight nickel, about 19 percent by weight tungsten and about 2 percent by weight fluorine, all based upon the total catalyst, and the cracking carrier consists essentially of about 25 percent by weight alumina and about 75 percent by weight silica.

6. The process of claim 1 wherein the feed stock and hydrogen are initially contacted at a temperature from about 500° to about 700° F., the temperature is gradually increased during the process and the process is terminated when a temperature in the range from about 640° to about 850° F. is attained.

7. The process of claim 6 wherein the initial temperature is from about 600° to about 700° F. and the terminal temperature is from about 640° to about 800° F.

8. The process of claim 1 wherein the feed stock is a furnace oil boiling in the range from about 350° to about 650° F. and containing up to about 2000 p.p.m. of nitrogen, the temperature is from about 500° to about 800° F. and the hydrogen partial pressure is from about 750 to about 1500 p.s.i.

9. The process of claim 8 wherein the temperature is from about 615° to about 700° F. and the hydrogen feed rate is from about 3500 to about 7000 standard cubic feet per barrel of feed stock.

10. The process of claim 8 wherein the feed stock and hydrogen are initially contacted at a temperature from about 500° to about 650° F., the temperature is gradually increased during the process and the process is terminated when a temperature in the range from about 640° to about 800° F. is attained.

11. The process of claim 10 wherein the initial temperature is from about 615° to about 650° F. and the terminal temperature is from about 640° to about 700° F.

12. The process of claim 1 wherein the feed stock is a gas oil boiling in the range from about 650° F. to about 1100° F. and containing up to about 6000 p.p.m. nitrogen, the hydrogen partial pressure is from about 1000 to about 3000 p.s.i. and the hydrogen feed rate is greater than about 3500 standard cubic feet per barrel of feed stock.

13. The process of claim 12 wherein the temperature is from about 650° to about 800° F., the liquid hourly space velocity is from about 1.0 to about 3.5 and the hydrogen feed rate is greater than about 5000 standard cubic feet per barrel of feed stock.

14. The process of claim 12 wherein the feed stock and hydrogen are initially contacted at a temperature from about 500° to about 700° F., the temperature is gradually increased during the process and the process is terminated when a temperature in the range from about 700° to about 850° F. is attained.

15. The process of claim 14 wherein the initial temperature is from about 650° to about 700° F. and the terminal temperature is from about 700° to about 800° F.

16. The process of claim 10 wherein the initial temperature is from about 635° to about 650° F. and the terminal temperature is from about 640° to about 685° F.

References Cited
UNITED STATES PATENTS

| | | | |
|---|---|---|---|
| 3,222,272 | 12/1965 | Bercik et al. | 208—254 |
| 3,264,211 | 8/1966 | Nager | 208—254 |
| 3,294,673 | 12/1966 | Peck et al. | 208—254 |
| 3,340,180 | 9/1967 | Beuther et al. | 208—251 |

DELBERT E. GANTZ, *Primary Examiner.*

G. J. CRASANAKIS, *Assistant Examiner.*